United States Patent [19]

Krabbenhoeft

[11] Patent Number: 5,559,903
[45] Date of Patent: Sep. 24, 1996

[54] METHOD FOR GENERATING GEOMETRIC MASKS WITH A DIGITAL COLOR COMPUTER

[75] Inventor: Uwe-Jens Krabbenhoeft, Landwehr, Germany

[73] Assignee: Linotype Hell AG, Kiel, Germany

[21] Appl. No.: 224,050

[22] Filed: Apr. 7, 1994

[30] Foreign Application Priority Data

Apr. 8, 1993 [DE] Germany ............................ 43 11 613.2
Dec. 21, 1993 [DE] Germany ............................ 43 43 581.5

[51] Int. Cl.[6] ................................................... G06K 9/20
[52] U.S. Cl. ......................... 382/283; 382/217; 382/254; 382/191; 358/504; 358/527; 358/532; 364/526
[58] Field of Search ...................... 382/54, 33, 17, 382/18, 56, 8; 358/504, 406, 532, 500, 527, 531, 525; 345/186; 364/526

[56] References Cited

U.S. PATENT DOCUMENTS

| | | | |
|---|---|---|---|
| 4,275,413 | 6/1981 | Sakamoto et al. | 358/80 |
| 4,393,399 | 7/1983 | Gast et al. | 358/531 |
| 4,476,487 | 10/1984 | Klie et al. | 358/531 |
| 4,488,245 | 12/1984 | Dalke et al. | 364/526 |
| 4,745,465 | 5/1988 | Kwon | 358/80 |
| 4,812,903 | 3/1989 | Wagensonner et al. | 358/80 |
| 4,821,208 | 4/1989 | Ryan et al. | 345/186 |
| 4,887,151 | 12/1989 | Wataya | 358/80 |
| 4,975,769 | 12/1990 | Aizu et al. | 358/80 |
| 5,060,280 | 10/1991 | Mita et al. | 382/33 |
| 5,202,935 | 4/1993 | Kanamori et al. | 382/17 |
| 5,216,498 | 6/1993 | Matsunawa et al. | 382/17 |
| 5,258,829 | 11/1993 | Matsunaga et al. | 358/527 |
| 5,268,754 | 12/1993 | Van de Capelle et al. | 382/17 |
| 5,270,808 | 12/1993 | Tanioka | 358/527 |
| 5,307,182 | 4/1994 | Maltz | 358/525 |
| 5,331,442 | 7/1994 | Sorimachi | 358/532 |

FOREIGN PATENT DOCUMENTS

| | | | |
|---|---|---|---|
| 0405790A2 | 1/1991 | European Pat. Off. | G06F 15/70 |
| 0159691B1 | 2/1991 | European Pat. Off. | H04N 1/46 |
| 0517374A1 | 12/1992 | European Pat. Off. | H04N 1/46 |
| 3024126C3 | 2/1983 | Germany | H04N 1/40 |
| 3110517C2 | 10/1983 | Germany | G03F 3/08 |
| 2923468C2 | 1/1984 | Germany | G01J 3/50 |
| 3110222C2 | 6/1985 | Germany | G03F 3/08 |
| 4104467A1 | 8/1992 | Germany | H04N 1/40 |
| 2053619 | 2/1981 | United Kingdom | H04N 1/46 |

*Primary Examiner*—Jose L. Couso
*Assistant Examiner*—Anh Hong Do
*Attorney, Agent, or Firm*—Hill, Steadman & Simpson

[57] ABSTRACT

In a method for producing geometric masks, a color image is displayed on a monitor. Color samples are taken from the image with a coordinate input unit and are deposited in a color sample memory. Color correction values that modify colors identified by the color samples can be input. A color computer serves the purpose of fast calculation of the color correction. For generating geometric masks, the color computer is loaded with an extreme value at the locations that are identified by the color samples. For that purpose, a table in the color computer is loaded with the extreme value at the corresponding location. The color image data are then applied to the color computer and the output data of the color computer are compared to a threshold. When the result is positive, a location in the mask memory is set. After all image pixels have been compared in this way to the thresholds, the mask memory contains a geometric mask at all locations that belong to the color samples. The masks in the image can be displayed on a monitor and can be used in the standard way for image processing.

27 Claims, 7 Drawing Sheets

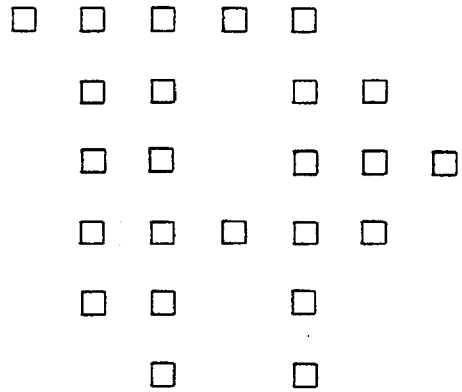
Fig. 7a COLLECTED COLOR SAMPLES
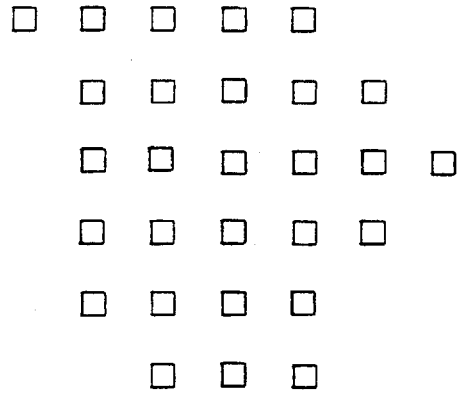
Fig. 7b GAPS FILLED

METHOD FOR GENERATING GEOMETRIC MASKS WITH A DIGITAL COLOR COMPUTER

RELATED APPLICATIONS

The present application is related to the following two copending applications: Peter Dorff et al application entitled "METHOD FOR GENERATING UNIFORM COLOR AREA DEFINITIONS WITH ADDITION AND REMOVAL OPERATORS", Hill Firm Case No. P-94,0784; and Peter Dorff et al application entitled "METHOD FOR GENERATING HARMONIC COLOR CORRECTIONS IN A COLOR SPACE, PARTICULARLY A CIELAB COLOR SPACE", Hill Firm Case No. P-94,0785.

BACKGROUND OF THE INVENTION

The invention is directed to a method and to an arrangement for generating masks in fine-area correction (also referred to as selective color correction or color retouch) for image processing. Methods for generating masks are already known from the prior art. One possibility is comprised in placing a mask (often also referred to as "lasso") around a color to be corrected in the image, as shown in FIG. 1. An area in the image that contains the selected color is traced with the cursor and a geometric mask is thus produced. The color correction then only acts on the area inside the mask. The problem of this method is that very bright or very dark regions of the color are also covered. This can lead to an over-correction of the dark or light locations, which is noticed in the color-corrected image as disturbing color dots. Further, the demarcation of the mask in the image or the generating of the mask must occur very precisely, since the entire color area will otherwise not be covered, or an adjoining color that is not to be corrected is also covered. This then leads to color breaks at the locations in the image where different colors abut one another.

The German Patent Application of Linotype-Hell AG, DE-A-4311611.6 "Stuetzstellenkorrektur", filed 8 Apr. 1993, copending U.S. Ser. No. 08/224,473, filed Apr. 7, 1994, now U.S. Pat. No. 5,489,921, discloses that color samples be taken from an image. These color samples form an irregular collection of points, in what is referred to as a "cloud" in the color space. This cloud thereby determines the area of the colors that are subjected to a color correction. A mask for the colors in the image that lie within this cloud can now be generated with this cloud. A check must now be carried out for every picture element to see whether it lies inside the cloud. For that purpose, the color data of the color pixels are compared to those of the cloud. When coincidence is present, then the color pixel lies within the cloud and a mask is placed at this location. This method is complicated and computation-bound because every individual picture element is compared to the points of the cloud.

SUMMARY OF THE INVENTION

It is an object of the present invention to resolve the afore-mentioned problems and present a simple method for mask generation in selective color retouch.

According to the method of the invention, geometric masks are generated within a color image that was deposited in a store. A monitor is provided for displaying the stored color image and/or a corrected color image and/or other image data. A coordinate input means indicates image coordinates on the monitor. A color sample memory stores color samples. A mask memory stores one or more masks. A color computer corrects color values of the stored color image. An image store stores the original color image and/or the corrected color image. Color samples are taken from the color image with the coordinate input means. The collected color values of the color samples are stored in the color sample memory. The arrangement of the color samples in a color space can be displayed on the monitor with a color coordinate system. The color samples that have been acquired can be subjected to a filtering. The color sample space produced in this way or the color sample spaces produced in this way in a color space have an arbitrary shape and are employed for selective color correction. Color correction values can be input that act on the color defined by the color sample spaces. The color computer uses the color sample spaces that have been generated and the color correction values for the selective color correction of the color image. An extreme value is written into the color computer at the locations in the color space that are defined by the color sample spaces, and the image data of the original color image are applied to the color computer. The output data of the color computer generated in this way are compared to a threshold. A memory cell is set in the mask memory when the comparison shows that the color data belong to one of the color samples. The geometric masks generated in this way are displayed in the image on the monitor. The color image processed in this way are stored in the image store.

BRIEF DESCRIPTION OF THE DRAWINGS

FIG. 7a is an example of collected color samples; and

FIG. 7b shows color samples filtered by the function "SMOOTH SELCTION."

DESCRIPTION OF THE PREFERRED EMBODIMENTS

A preferred embodiment of the invention shall be described first in the following specification. It is assumed in the preferred embodiment of the invention that an image is digitally stored in the CIELAB color space (see DIN 5033). This color space is formed of the luminance axis L*, of the red/green axis a* and of the yellow/blue axis b*. It is constructed approximately in conformity with sensation corresponding to the color sensation of man. The CIELAB color space makes it possible to exchange color data independently of apparatus and system. The image data are identified by opto-electrical scanning of the originals with scanners known in reproduction and by subsequent analog-to-digital conversion of the image signals acquired in the scanning.

Figure 1:
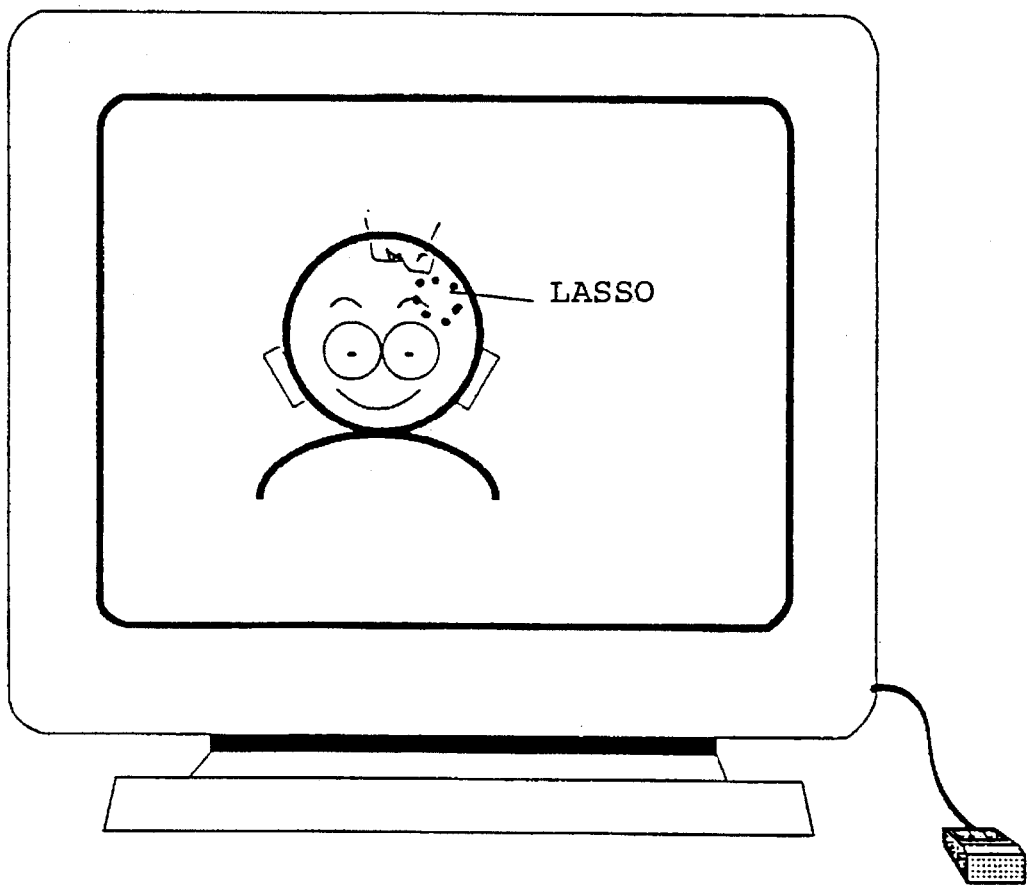
FIG. 1 illustrates the generating of a geometric mask (prior art)
Figure 2:
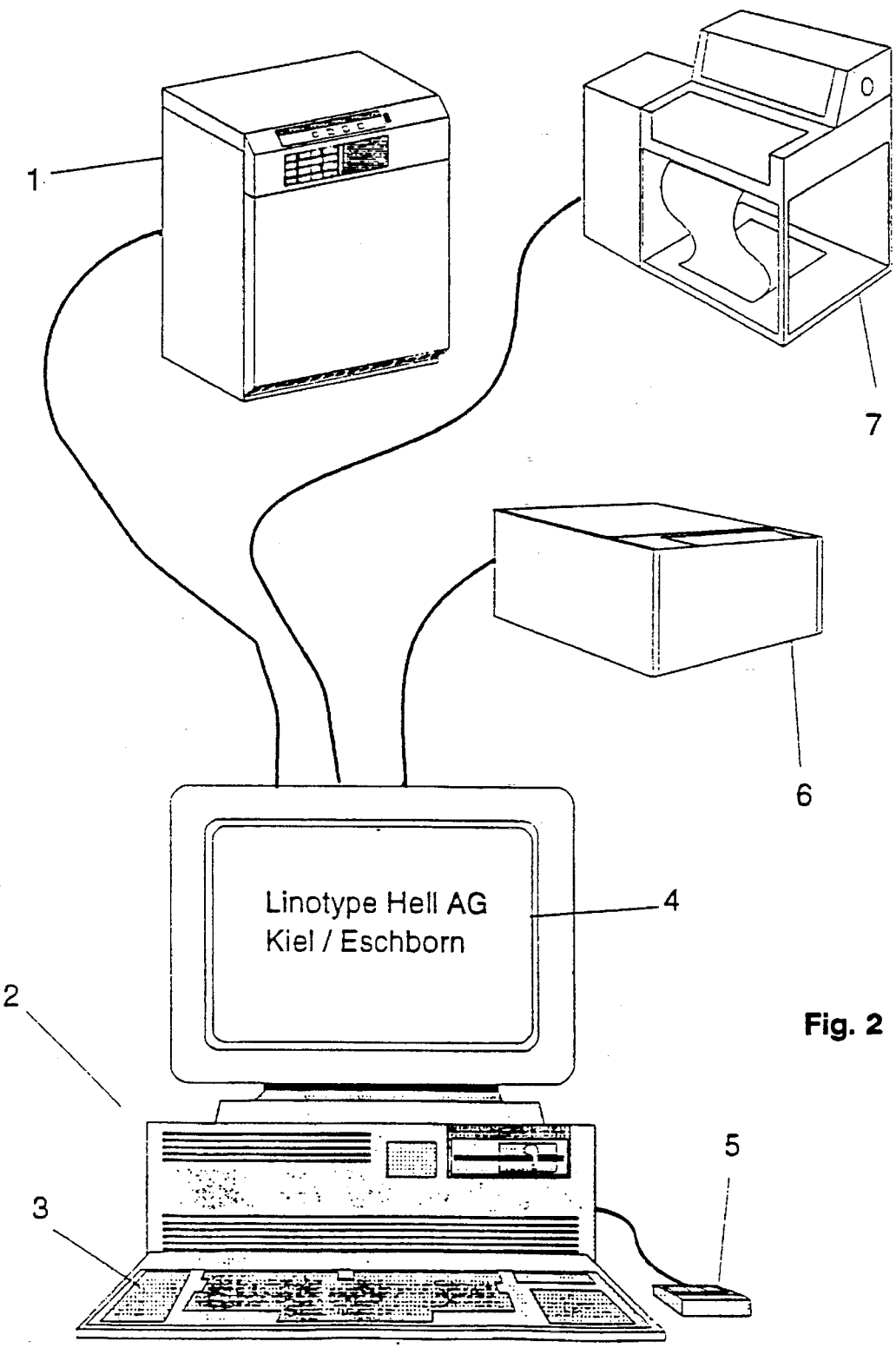
FIG. 2 illustrates a general overview of a system employed in the invention.

FIG. 2 shows a general overview of the system employed in the preferred embodiment. A scanner (for example, Chromagraph S 2000 of Linotype-Hell AG, Kiel, Germany) for scanning originals is referenced 1, this supplying image data in digital form to a work station 2 (for example, Apple Macintosh of Apple Incorporated, California, USA) that is provided with a keyboard 3 for inputting data and with a monitor 4 for displaying data. A mouse 5 is present for inputting picture screen coordinates. This mouse, however, can also be replaced by an xy tablet, by a track ball, by a joy stick or by a similar coordinate input means. For faster processing of the color image data, a color computer 6 (CTU Color Transformation Unit of Linotype-Hell AG) is connected to the work station 2. This color computer 6 undertakes the necessary color calculations. The color computer 6 can also be implemented by a corresponding program or software. The processing of the color data then occurs correspondingly slower. An output means 7 (for example, a Recorder Chromagraph R 3020 of Linotype-Hell AG) is present for outputting color separations, and completely processed color separations can be output therewith.

Figure 3:
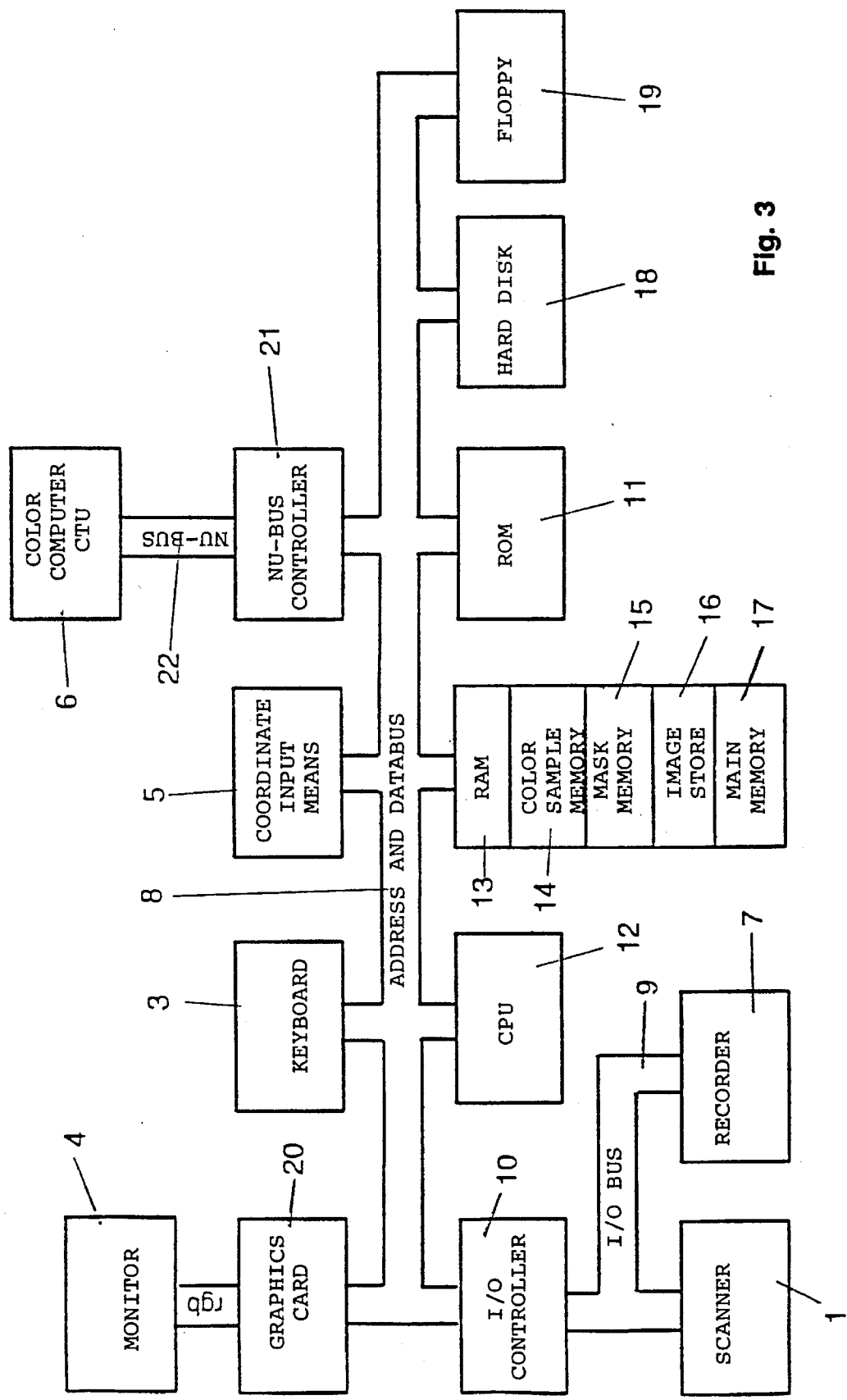
FIG. 3 is a block diagram of the system employed in the invention.

The block diagram in FIG. 3 provides an overview of the signal flow within the system. All components of the work station 2 are connected to one another via an internal bus 8. The data from the originals' scanner I proceed via the I/O bus 9 and via the I/O controller 10 onto the internal bus 8 and are then deposited in the RAM 13 or on the hard disk 18. The I/O controller 10 controls the data flow of the external input and output devices with the internal system. Other input and output devices such as, for example, a photo CD tape drive that supplies data in the YCC format, a flat bed scanner, a laser printer, etc., can also be connected to the work station 2, the originals' scanner 1, and the recorder 7.

The program necessary for the operation of the CPU 12 is stored in the ROM 11. The RAM 13 is subdivided into a plurality of areas for storing various data, for example image data and data that are needed for the operation of the system. One area of the RAM 13 is used as memory for color samples or as color sample memory 14. The color sample memory 14 in the RAM 13 is organized such that the L*a*b* color values can address a location in the color sample memory 14. Another area serves as a mask memory 15. The masks generated with the coordinate input means 5 are stored here for the color image that was deposited in the color image store 16. The mask memory 15 can be divided into various areas in order to deposit a plurality of independent masks. The main memory 17 serves for the deposit of the intermediate results and for intermediate storage. The overall functions of the system are controlled by the CPU 12. Data files and other data can be stored on a hard disk 18. The hard disk 18 can also be replaced by some other bulk storage. Data can likewise be deposited on the floppy 19. The monitor 4 serves the purpose of displaying image data and other data and has its own graphics card 20 with a picture screen memory for faster output of image data. The keyboard 3 serves the purpose of inputting commands to the CPU 12 and other data. For faster color correction of color image data, a color computer 6 is connected via a NU bus controller 21 and via a NU bus 22. The detailed description thereof shall follow later.

Upon startup of the system, a main program is first started and all system components are initialized. Variables are set to a standard value. A user surface for operating and controlling the system and the individual components is constructed on the monitor 4. The user surface contains a plurality of picture screen windows for displaying various information and a plurality of pull-down menus for setting and inputting other functions and data.

Figure 4:
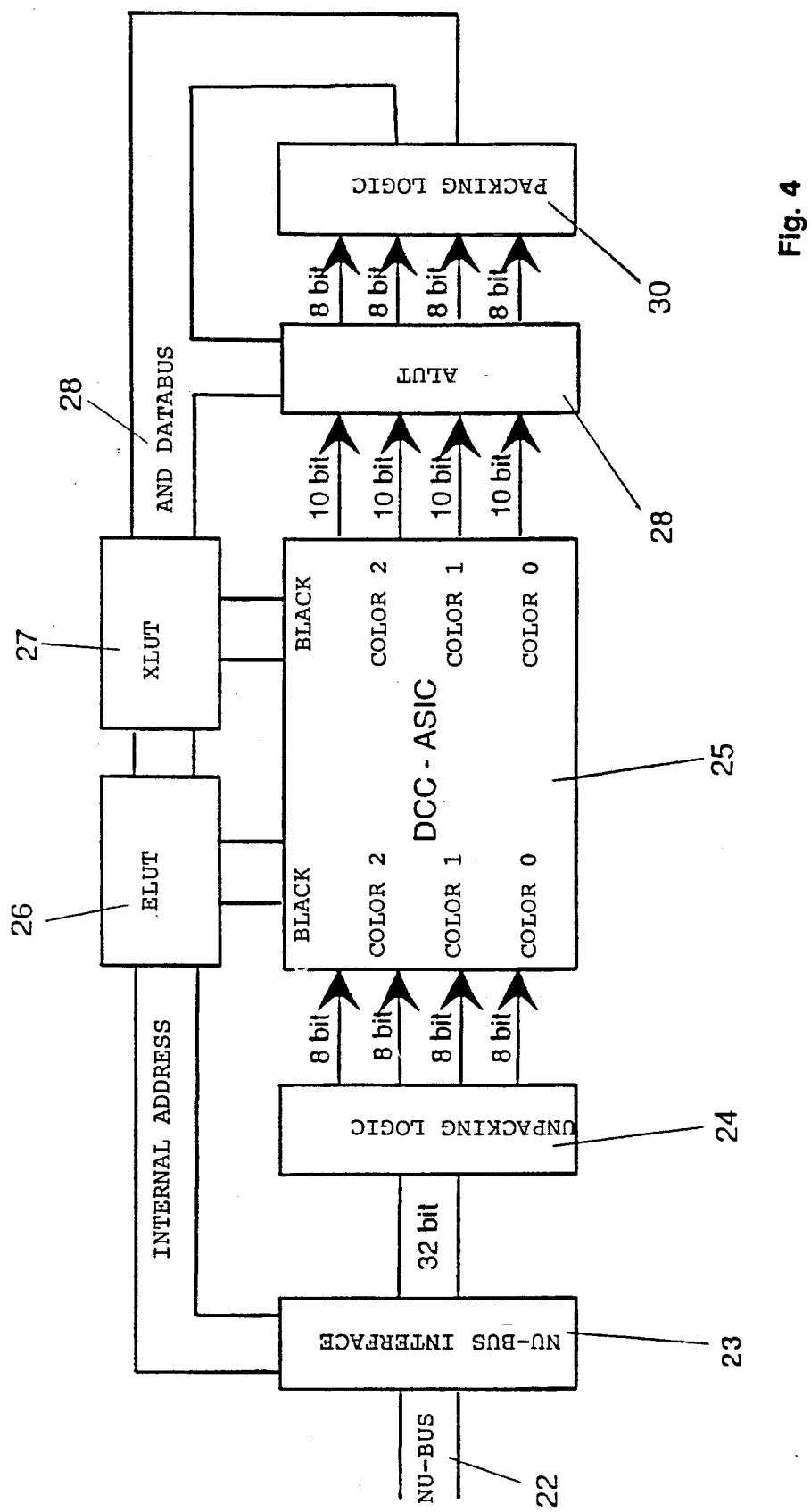
FIG. 4 is a block diagram of a color computer (CTU) employed in the invention.

The color computer 6 in FIG. 4 communicates with the work station 2 via the NU bus 22. The color image data are first sorted by the depacking logic 24 according to a prescribed format and are then supplied to a block referenced DCC-Asic 25. The DCC-Asic 25 (Digital Color Conversion) is composed of a specific circuit that undertakes an interpolation of color data and of a NU bus interface 23 for controlling the data flow. An input table ELUT 26 initially converts the 8-bit color data into 10-bit values. The necessary color correction is then undertaken with the XLUT 27. For that purpose, the 5 MSB of the color data address a corresponding location in the XLUT 27. An interpolation of the output values is then undertaken in the DCC-Asic 25 with the 5 LSB of the color data and of the values from the XLUT 27. The DCC-Asic 25 is responsible for the actual calculating operation of the color conversion. The three-dimensional interpolation of a color dot is implemented according to the principle of tetrahedron interpolation (see DE-C-2813519) with the four corner points V0 through V3 of the tetrahedron surrounding the dot. These four corner points are successively read out from the XLUT 27 by the DCC-Asic 25, and are subsequently weighted and added up. This occurs in parallel for all three or four colors to be converted (inputs of black, color 0, color 1, color 2 of the DCC-Asic 25). The output values calculated in this way can be forwarded in parametered fashion directly onto the outputs (black, color 0, color 1, color 2) of the Asic, or can be previously multiplicatively operated with the black value. The addresses for reading the tetrahedron corner points V1 . . . V3 from the XLUT are acquired by the DCC-Asic 25 from the 5 MSB of the color inputs. The output values are supplied to an output table ALUT 28 that undertakes a conversion from the 10-bit format into an 8-bit format. A packing logic 30 sorts the output color data according to a desired format. The color image data are then supplied via the NU bus 22 to the work station 2 and can be correspondingly further processed and stored. Desired fillings are written into the ELUT 26, XLUT 27, ALUT 28 via the internal data and address bus 29.

For a fine-area correction, a color image is first loaded into the image store 16 from the input device 1, the hard disk 18 or the floppy 19. Since work is preferably carried out in the CIELAB data format, the color data are correspondingly converted when they are not present in the CIELAB format. For that purpose, the tables of the ELUT 26, XLUT 27, and ALUT 28 are provided with a corresponding filling. The CPU 12 then reads the original image data, which are not established in the CIELAB format, from the image store 16 and forwards them via the NU bus 22 to the input of the color computer 6. The convened data can then be taken at the output of the packing logic 30 via the bus 29 and the NU bus interface 23 and can be deposited into the image store 16. Data that are supplied in a different format from an input device initially undergo this conversion process so that they are internally present in the CIELAB format.

The system can process arbitrary input formats such as, for example, RGB or YCC, on the basis of a plurality of different conversion processes. Assuming that the data files generated by scanners or other application programs are present in the TIFF or PICT data file format, they can also be read in and can also be converted into the CIELAB format. Television signals or video signals in different standards such as, for example, NTSC, PAL, SECAM, HD-Mac, and MPEG2 can also be processed.

Just as a conversion of various input formats occurs at the input side, a conversion into a desired output format of the image data such as, for example, CMYK (cyan, magenta, yellow, black) or RGB (red, green, blue) is possible at the output side. The conversions of the various formats can occur on the basis of a plurality of sub-programs that are stored on the hard disk 18, on the floppy disk 19 or in the ROM 11, and that are executed by the CPU 12 after the I/O controller 10 has written new image data into the RAM 13 or after data have been output from the RAM 13 to an output device via the I/O controller 10. The CPU 12 then calls a specific conversion program for the corresponding data conversion which places the data into the necessary format.

A conversion from CIELAB to the RGB format and back is likewise undertaken in order to display the image on the monitor 4. The picture screen memory of the graphics card 20 is loaded with the RGB image data for this purpose. The image can then be displayed on the picture screen in an image window. A plurality of image windows can be present for a color correction in order to display the original and the manipulated color image side-by-side. The monitor 4 should be calibrated for a true-to-color reproduction of the colors.

For a fine-area correction, the color sample memory 14 is erased in that a "0" is written into all memory cells of the color sample memory. For taking color samples with a coordinate input means 5, the CPU 12 first reads the input coordinates on the image window that have been specified with the coordinate input means 5, for example a mouse in this case, and then reads the corresponding color values from the image store 16 of the RAM 13. The conversion of cursor coordinates into addresses for memories is disclosed by the patent application WO 80/02612 "Preuss et al" of Linotype-Hell AG. The corresponding location in the color sample memory is then written via the bus 8. For that purpose, the color data L*,a*,b* of the image pixel sought with the coordinate input means 5 address a corresponding location in the color sample memory that is then set. For that purpose, a I can be written into the corresponding memory cell.

After color samples have been taken from an image with the coordinate input means 5, the color sample memory 14 contains a corresponding plurality of color samples. The color samples can be subjected to a filtering with the CPU 12. The detailed description of the filtering shall be provided later. For that purpose, the CPU 12 reads the color data from the color sample memory 14 and implements a corresponding filter program. Intermediate results are stored in the main memory area 17 of the RAM 13. After the filtering has been ended, the color sample memory 14 is newly written with the filtered values. A copy of the original color samples can be deposited in the main memory 17.

Figure 5:
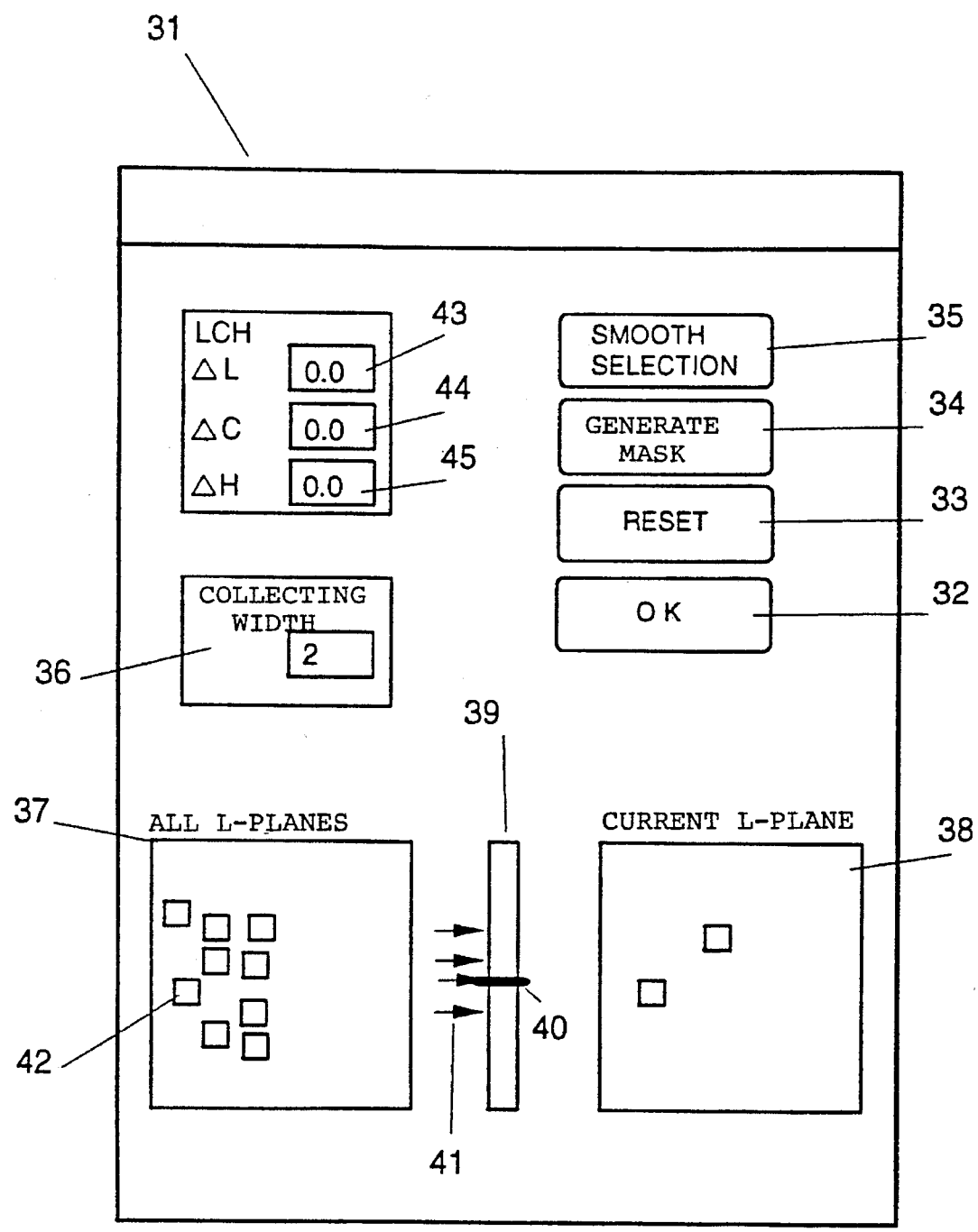
FIG. 5 is a picture screen display for fine-area correction.

A selective color correction of color areas can be undertaken by calling in a dialogue window "fine-area correction" 31. A dialogue window 31 as may be seen in FIG. 5 is displayed. The color sample memory 14 is erased by clicking with the mouse into the input field "reset" 33, and the collecting width for color samples in the color space is set to the value 2. As a result thereof, only those points in the CIELAB color space that have the same classification are selected. The following settings for the collecting width are possible (they refer to the colors in the CIELAB color space):

0=select individual dot

1=selected dot plus the dot lying thereabove and therebelow in luminance

2=selected dot plus all directly neighboring dots

3=selected dot plus the dots spherically located therearound the radius of the sphere is thereby equal to 2

4=selected dot plus the dots spherically located therearound the radius of the sphere is thereby equal to 3 etc., until 15=selected dot as well as the dots spherically located there around—the radius of this sphere is thereby equal to 14.

These values can be input into the input field "collecting width" 36 by the operator with the keyboard 3. A standard value of 2 is set for the fine-area correction as long as the operator does not input a different value. The color sample memory 14 is erased by calling in the function "reset"; no undesired color samples are thus located in the color sample memory. As a next step, the operator of the system collects new color samples from the color image to be corrected, this being displayed on the monitor 4. For that purpose, the cursor is moved with the coordinate input means 5 into an area of the image that is to have its color modified. This, for example, can be a skin color or an especially pale color in the image. After the cursor has been moved onto the desired color pixel, a sample having the corresponding color is taken from the image by clicking with the left-hand mouse key, and the corresponding L*a*b* color values address the corresponding memory cell in the color sample memory 14, this now being set ("1"=sample taken). In order to avoid errors in the selection of the color pixels, pixels in the proximity of the pixel that has been clicked onto can also be taken and can also be deposited in the color sample memory. For example, pixels that lie within a 3×3 matrix around the selected pixel in the image can also be considered.

The step of taking color samples can now be repeated a number of times until an adequate plurality of color samples of the color has been selected. The color sample memory 14 thus also accepts into the color sample memory dark and bright areas of the color, or of the transitions of the color in the area, to another color.

The color coordinates of the selected color samples in the CIELAB color space are displayed in the dialogue window 31 (FIG. 5) on the luminance axis L* (FIG. 6) and in the color selection or a*b* plane. The LAB color space is displayed as viewed from above in the left-hand color selection 37, i.e. all samples are displayed regardless of their L* value. Only the color samples in the current L* plane that was set by the marking 40 are displayed in the right-hand color selection. The axis 39 in the middle indicates the L* axis. The arrows 41 identify the L* planes where color samples were. By shifting the slide 40, a current luminance plane can be selected. The operator can view the a*b* values on the right-hand color selection 38.

Figure 6:
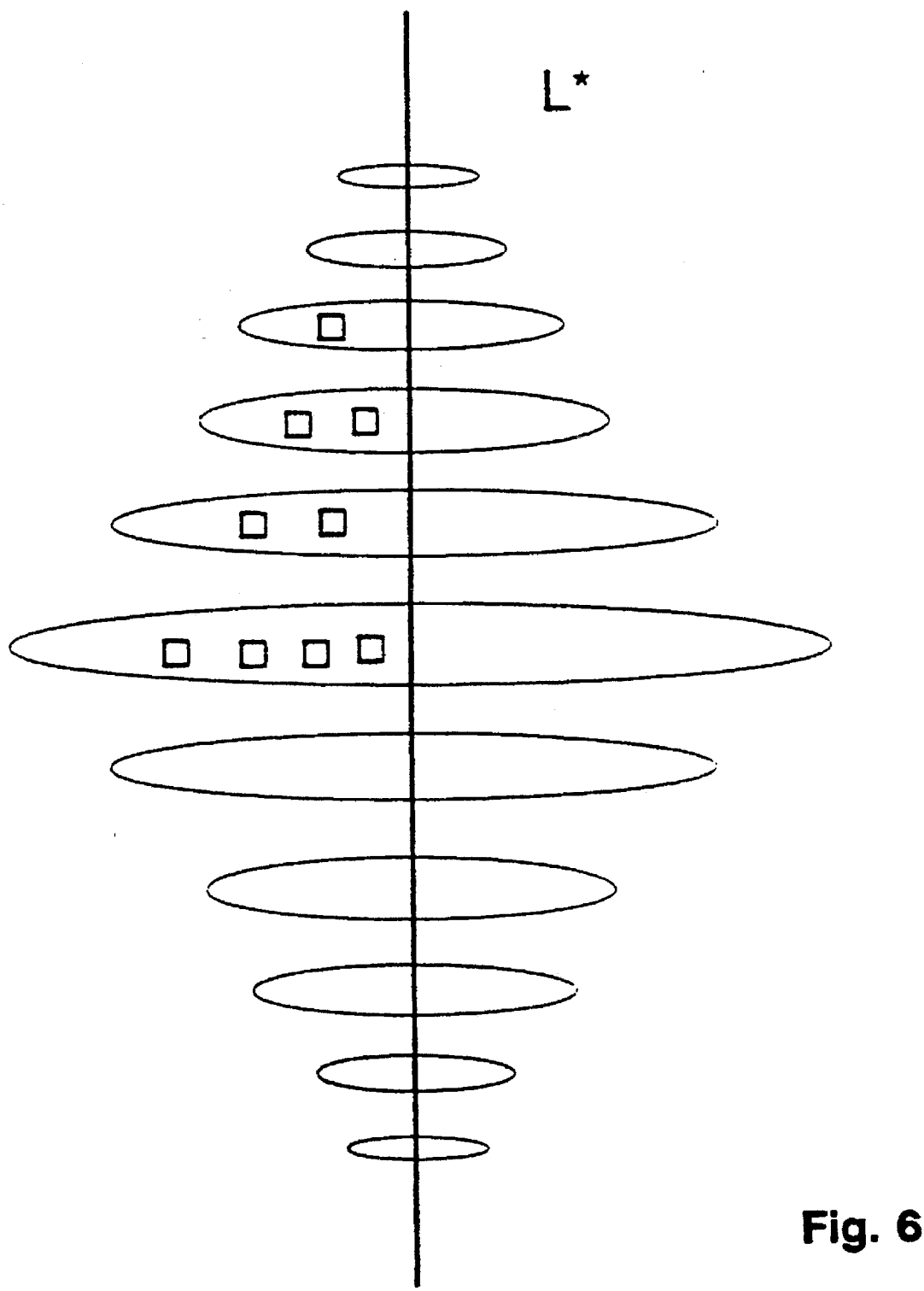
FIG. 6 illustrates collected color samples in the L* plane.

In the color space shown in simplified fashion, FIG. 6 shows various luminance levels in which color samples have been taken.

When the operator is not satisfied with the current color sample selection, further color samples can be subsequently collected. Samples 42 in the color selection can also be directly set in that the operator clicks with the mouse onto the corresponding location in the color selection 37 or color selection 38.

The collected color samples can now also be subsequently manipulated by the functions of "smooth selection" 35 and "generate mask." By clicking onto the field "mask" 34, a mask is produced for all colors in the image that correspond to the color samples that have been taken. The locations in the image identified in this way are then displayed in a special color, transparently, or with a pattern, so that the masks can be clearly recognized in the image. It is also possible to display only the contours of the mask. The image areas that are masked can therefore not be varied; the image areas that are not masked can be processed. The mask that has been produced is inversely displayed with a function "invert." What this means is that the image parts that were previously marked are now unmasked (unprotected) and the image parts that were previously unmasked are now masked (protected).

Given a satisfactory selection of the color samples, the input of color correction values now follows as a next step. The input occurs as a delta value into the input fields 43, 44, 45. The values by which the selected color area are to be corrected, i.e. are to be shifted in the color space, are input here. The middle dots of the area are then modified by the values that have been set. In order to assure harmonic color transitions, the correction decreases in the direction toward the outer dots in the color sample space. The input of the color correction values preferably occurs in the LCH color system, which is equivalent to the CIELAB system. The realized user surface LCH derives the setting values for the luminance (L), chrominance (chroma C) and for the hue (H) from the CIELAB color space. (Luminance L=L; chrominance $C=\sqrt{a^{*2}+b^{*2}}$, hue H equals arctan (B*/a*).) The colors can thus be corrected in conformity with sensation according to luminance, chrominance and hue. The value range for the luminance L extends from 0 for absolute black up to 100 for reference white. All gray scale tones free of chrominance are located between 0 and 100. Setting possibilities from 0 through 100 also preferably form the basis for the chrominance. The position of the hue is defined in degrees in the color circle. Accordingly, settings from 0 through 360 are possible for the hue H. The original color image and the corrected color image can now be displayed side-by-side on the monitor 4 with and without the dialogue window; or only the corrected color image is displayed, dependent on the option of the operator. When the color correction is not satisfactory, other values can be input. When the color correction is satisfactory, the image is deposited in the store 16 or on the hard disk 18 by clicking into the input field 32 "okay."

The color samples taken from the image form an irregular collection of dots in the CIELAB color space, and what is referred to herein as a "cloud." A plurality of clouds can also have arisen dependent on how many different colors have been taken from the image. As a rule, however, the individual clouds have unoccupied locations in the color space or color sample memory. Moreover, potentially singular dots are occupied in the color space.

When a color correction is now calculated with this cloud, then a harmonic behavior of the color correction is not obtained; for example, discontinuities in the colors can occur. A filling of the undesired gaps can be achieved with an add-on operator. Moreover, it is also possible to enlarge the cloud given a corresponding selection of a threshold. Analogously, a removal of the undesired, singular dots, or making the cloud smaller, can be realized with a take-away operator.

In order to achieve these operations, the weighted sum of every dot and its proximity is calculated as in a three-dimensional, digital filtering (see Anil K. Jain "Fundamentals of Digital Image Processing", Prentice Hall International Editions 1989; expanded to three dimensions here):

P(x,y,z) value of the dot at the location x, y, z; 0 or 1

W a suitable window having the dimensions (2l+1), (2m+1), (2k+1)

a(i,j,k) (weighting window)

A sum S is formed which is compared to a threshold T.

$$S(x,y,z) = \sum_i \sum_j \sum_k a(i,j,k) P(x+i, y+j, w+k)$$

with
$-l >= i >= +l$
$-m >= j >= +m$
$-n >= k >= +n.$

For example, the filter window has the dimensions 3×3×3, i.e. l=n=m=1; correspondingly, i,j,k run from −1,0 to +1.

This sum S is then compared to the threshold of the add-on operator. When the sum is greater, then the dot is set. The take-away operator works analogously thereto for sums that are smaller than the corresponding take-away threshold. When the sum is smaller than the take-away thresholds, the dot is cancelled.

When the function "SMOOTH SELECTION" 35 is called in the dialogue window "fine-area correction" 31, the following function is now implemented, an example thereof being shown in FIG. 7. Since the data are processed in the CIELAB color space in the preferred embodiment of the invention, the following equations then derive:

P(L*,a*,b*) color sample at the location L*a*b* in the color space or color sample memory—amount 0 or 1 a(i,j,k) suitable weighting matrix for weighting the color samples

W a suitable window having the three dimensions (2l+1), (2m+1), (2n+1).

Deriving for a dot at the location L*a*b* in the color space for the sum S(L*,a*,b*) is $$S(L^*,a^*,b^*) = \sum_i \sum_j \sum_k a(i,j,k) P(L^*+i, a^*+j, b^*+k)$$

with the values for i,j,k that are defined by the size of the filter window $-l >= i >= +l$
$-m >= j >= +m$
$-n >= k >= +n.$ Dependent on the selection of the thresholds for the add-on operation and for the take-away operation, different effects derive in the filtering of the color samples. Upon start up of the system, standard values are set for the thresholds; these, however, can be modified as a result of the operator calling a menu in the user surface. For example, this can occur in a specific service mode wherein other system parameters are also modified.

The function of "smooth selection" is a combination of the add-on operation and of the take-away operation. The corresponding dot in the color sample memory is set when it is greater than the threshold and is erased when it is lower than the threshold. For that purpose, the sum S(L*, a*, b*) is successively compared to the add-on threshold Tλ and to the take-away threshold Tε. It is also conceivable to employ only one threshold for both operations, instead of two different thresholds. FIG. 7a shows a cloud with gaps and two individual dots before the implementation of the function "SMOOTH SELECTION"; and FIG. 7b shows the cloud after the filtering. The two individual dots have been removed and the gaps have been closed.

As a result of the filtering of the clouds, closed sub-color spaces or color samples spaces have arisen in the color space, these being employed for calculating the color correction. The color sample spaces thereby define the area of the colors that are to be shifted in the color space corresponding to the values 43, 44, 45 input in the fine-area menu 31. The corresponding fillings of the XLUT 27 is loaded with values modified according to the color correction values at the locations defined by the color sample spaces. For that purpose, the corresponding locations in the color sample memory 14 at which a color sample was set are converted into addresses for the XLUT 27, and the corresponding value is then written via the data bus 29 at the addressed location in the XLUT. A color correction for the image deposited in the store 16 can now be calculated with the modified values in the XLUT 27. For that purpose, the image data are applied to the color computer 6 via the NU bus 22. The color-corrected value then appears at the output of the color computer 6; this can in turn be deposited in the store. The operator can view the color-corrected image on the monitor 4.

The color correction now acts globally on the colors in the image that had been defined by the color sample spaces. In order to make these locations in the image clearly visible, a mask appears at the locations where the color correction takes effect. This mask can be employed to exclude a further color processing at these locations or to process only these locations in the image. Further, the image montages that are standard in image processing such as, for example, cutting areas out, copying, enlarging, reducing, mirroring, inverting, etc., can be implemented with these masks.

In order to produce the masks, all image pixels must be compared to the color samples that have been taken. When the color values coincide, the corresponding location in the mask memory is set in that, for example, a "1" is written into the memory cell. Correspondingly, the mask is not set for picture elements that lie outside, since a "0" is written into the memory cell in the mask memory. In this method, every individual picture element must be analyzed, i.e. every picture element must be compared to all color samples that have been taken. The method is therefore extremely time-consuming and is not suitable for a fast mask generating. The present invention solves the problem in that the color computer 6 which is already present is used for mask generating. A color transformation table is generated for the digital color computer 6, this containing a fixed extreme value, for example 0 or 255, for the color areas to be masked but respectively containing the other value for the other colors. When the picture elements are now sent through the color computer 6, then a determination can be made with a threshold as to whether the respective picture element belongs to the mask or not in that the output value of the color computer 6 is compared to the threshold.

By calling the function "generate mask" in the dialogue window "fine-area correction" 31, the CPU 12 executes a corresponding program. The CPU 12 reads the color sample memory 14 out and writes corresponding data into the XLUT 27 via the NU bus 22. For that purpose, the CIELAB color data addresses a corresponding location in the XLUT 27. The extreme value is now written into this location. After the color sample memory 14 has been completely read out and the XLUT 27 has the filling corresponding thereto, the color data of the image to be processed are now sent to the color computer 6 via the NU bus 22. Color values of the image that coincide with the color values of the color samples, an extreme value, now appear for the CIELAB at the output of the color computer 6. The CPU 12 compares the output data of the color computer 6 to the threshold. The result is positive for the extreme values and the corresponding memory cell of the mask memory 15 is set. After all image pixels of the image have been compared to the threshold, the mask memory 15 contains a geometric mask at those locations in the image where the colors coincide with the colors that have been taken.

Image areas can be excluded from the mask generating if the operator desires that masks are not produced in the entire image area. For this purpose, these image areas can be manually masked by the operator. Ellipse, rectangle, brush and lasso are tools with which masks can be produced. A specific location for the production of these masks is reserved in the mask memory 15 given application of the mask tools. This location can be released again later. The following is valid for an ellipse and a rectangle: a mask contour is drawn with the mask tool. The mask contour can now be correctly positioned. The complete mask is displayed after the mask has been provided with a filling.

The image areas that are masked can thereby not be modified; the image areas that are not masked can be processed. All masks that are produced with the assistance of the mask tools are combined to form one mask. With an inverting function, the mask that has been produced is inversely displayed. This means that the image parts that were previously masked are now unmasked (unprotected) and the image parts that were previously unmasked are now masked (protected).

The mask produced with the mask tools and the mask generated with the color samples can now be combined with one another. Possible operations are "and", "or", and "not." In the "and" operation of the two masks, only regions that are covered by both masks are masked; in the "or" operation, the two masks are combined. With the "not" operation, an area from one of the masks can be cut out, this being defined by the other mask. The masks produced in this way can be stored with the processed image on the hard disk 18 or on the floppy 19, and can again be employed as a mask in a further image manipulation.

Other Embodiments

The above invention was described in the preferred embodiment on the basis of the employment of CIELAB color coordinates and by add-on and take-away operations.

In another embodiment of the invention, a CMYK color coordinate system is employed, instead of a CIELAB color coordinate system. The color correction values are then correspondingly input as CMYK values.

The filtering of the function "SMOOTH SELECTION" in the preferred embodiment of the invention was described here as a weighted sum that was compared to thresholds. Of course, the employment of other filter functions is possible.

The color sample memory 14 stores the color samples in a full resolution of 3×8 bits for the L*a*b* values. As a result thereof, the color sample memory 14 becomes correspondingly large. In order to reduce the memory capacity, the color samples can also be deposited in a memory having a reduced resolution for the color coordinates.

Instead of filtered color samples, the color samples can also be directly used for mask generating. In order to then remove potential gaps in the geometric masks, the memory cells that have been set in the mask memory 15 can be subjected to a filtering of a type similar to that which was set forth.

Although various minor changes and modifications might be suggested by those skilled in the art, it will be understood that I wish to include within the scope of the patent warranted hereon all such changes and modifications as reasonably come within my contribution to the art.

I claim as my invention:

1. A method for generating a geometric mask within a stored color image, comprising the steps of:

providing a monitor for displaying the stored color image;

providing a coordinate input unit for indicating image coordinates on the monitor and for collecting selected color samples from the color image;

providing a color sample memory for representing a three dimensional color space and for storing the selected color samples;

providing a two dimensional mask memory for storing at least one mask;

providing a color computer for correcting color values of the stored color image and for generating the mask;

providing in addition to said color sample memory a separate image store for storing the color image;

collecting color samples from the color image with the coordinate input unit;

storing the collected color samples in said color sample memory;

displaying an arrangement of the color samples in a color space on a monitor with a color coordinate system;

subjecting the collected color samples to a filtering to fill undesired gaps between the color samples if such undesired gaps are present, a color sample space produced by the filtering having an arbitrary shape;

writing an extreme value into the color computer at locations in the color space defined by the color sample space and applying image data of the color image to the color computer;

comparing output data of the color computer to a threshold;

setting a memory cell in the mask memory when the comparison to the threshold shows that color data belong to one of the color samples; and displaying the geometric mask generated in the above steps in the image on the monitor.

2. A method according to claim 1 wherein a collecting width for the color samples in the color space is freely selectable.

3. A method according to claim 2 wherein said collecting width for the color samples amounts to 1 in every dimension.

4. A method according to claim 1 including the step of subjecting the color samples to a three-dimensional filtering in the color space.

5. A method according to claim 1 including the step of subjecting the color samples to a four-dimensional filtering in a CMYK color space.

6. A method according to claim 1 wherein the color correction values comprise L*a*b* values that are added to or subtracted from the original color values.

7. A method according to claim 1 including the step of displaying data of the color coordinates of the color samples on a window on the monitor in addition to the color image.

8. A method according to claim 1 including the step of processing color values of the color samples in a L*a*b* color space.

9. A method according to claim 1 wherein color values of the color samples are provided according to a television standard.

10. A method according to claim 9 wherein the television standard is one of the standards selected from the group NTSC, PAL, and SECAM.

11. A method according to claim 1 including the step of processing color values of the color samples in a CMYK color system.

12. A method according to claim 1 wherein the color samples are collected in the color sample space having a reduced resolution.

13. A method according to claim 1 including the step of providing the coordinate input unit as a mouse.

14. A method according to claim 1 including the step of providing the coordinate input unit as an xy tablet.

15. A method according to claim 1 including the further step of inputting color correction values to the color computer that act on colors defined by the color sample space.

16. A method according to claim 15 including the step of with said color computer, using the color sample space that has been generated, using the geometric mask, and using the color correction values to provided a selective color correction of the color image in regions outside of the geometric mask.

17. A method for generating a geometric mask within a stored color image, comprising the steps of:

providing a monitor for displaying the stored color image;

providing a coordinate input unit for indicating image coordinates on the monitor;

providing a color sample memory for storing color samples;

providing a mask memory for storing at least one mask;

providing a color computer for correcting color values of the stored color image;

providing an image store for storing the color image;

collecting color samples from the color image with the coordinate input unit;

storing the collected color samples in said color sample memory;

displaying an arrangement of the color samples in a color space on a monitor with a color coordinate system;

subjecting the collected color samples to a filtering, a color sample space produced by the filtering having an arbitrary shape and being employed for selective color correction;

inputting color correction values that act on colors defined by the color sample space;

with said color computer, using the color sample space that has been generated and the color correction values for the selected color correction of the color image;

writing an extreme value into the color computer at locations in the color space defined by the color sample space and applying image data of the color image to the color computer;

comparing output data of the color computer to a threshold;

setting a memory cell in the mask memory when the comparison to the threshold shows that color or data belong to one of the color samples;

displaying a geometric mask generated in the above steps in the image on the monitor; and said step of subjecting the color samples to a filtering comprises providing the filtering in a L*a*b* color space and establishing the filtering by the function $$S(L^*,a^*,b^*) = \sum_i \sum_j \sum_k a(i,j,k) P(L^* + i, a^* + j, b^* + k)$$

whereby $a(i,j,k)$ is a weighting matrix, $P(L^*,a^*,b^*)$ is a color sample at location $L^*, a^*, b^*$ in the $L^*,a^*,b^*$ color space, and the sum $S(L^*,a^*,b^*)$ is compared to thresholds.

18. A method according to claim 17 including the step of filling gaps by the filtering and erasing individual points in the color sample space.

19. A method for generating a geometric mask within a stored color image, comprising the steps of:

providing a monitor for displaying the stored color image;

providing a coordinate input unit for indicating image coordinates on the monitor and for collecting selected color samples of the color image;

providing a color sample memory for representing a color space and for storing the selected color samples;

providing a mask memory for storing at least one mask;

providing a color computer for correcting color values of the stored color image;

providing in addition to said color sample memory a separate image store for storing the color image;

collecting color samples from the color image with the coordinate input unit;

storing the collected color samples in said color sample memory;

displaying an arrangement of the color samples in a color space on a monitor with a color coordinate system;

subjecting the collected color samples to a filtering to fill undesired gaps between the color samples if such undesired gaps are present, a color sample space produced by the filtering having an arbitrary shape and being employed for selective color correction;

writing an extreme value into the color computer at locations in the color space defined by the color sample space and applying image data of the color image to the color computer;

comparing output data of the color computer to a threshold;

setting a memory cell in the mask memory when the comparison to the threshold shows that color data belong to one of the color samples;

displaying a geometric mask generated in the above steps in the image on the monitor;

inputting color correction values to the color computer that modify colors defined by the color sample space; and with said color computer, using the color sample space that has been generated, using the geometric mask, and the color correction values, making the selective color correction of the color image in portions of the image not excluded by the mask.

20. A method for generating a geometric mask within a stored color image, comprising the steps of:

providing a monitor for displaying the stored color image;

providing a coordinate input unit for indicating image coordinates on the monitor and for collecting selected color samples of the color image;

providing a color sample memory for representing a three dimensional color space and for storing color samples;

providing a mask memory for storing a mask;

providing a color computer for correction of color values of the stored color image and for generating the mask;

providing in addition to said color sample memory a separate image store for storing an original color image or a corrected color image;

collecting color samples from a color image with the color input unit;

storing the color values of the collected color samples in the color sample memory;

displaying an arrangement of the color samples in a color space on the monitor with a color coordinate system;

subjecting the collected color samples to a filtering to fill in undesired gaps between the samples if such undesired gaps are present, the color sample space produced in a color space having an arbitrary shape;

with said color computer, using the color sample space for mask generating;

writing an extreme value into the color computer at locations in the color space defined by the color sample space, and applying image data of the color image to the color computer;

comparing output data of the color computer to a threshold;

when the comparison to the threshold shows that color data belong to one of the color samples, setting a memory cell in the mask memory; and generating the geometric mask by the above steps and displaying it in the image on the monitor and using it for image processing.

21. A method according to claim 20 including the step of subjecting the color samples to a three-dimensional filtering in the color space.

22. A method according to claim 21 including the step of filling in gaps by the filtering and erasing individual points in the color sample space by the filtering.

23. A method according to claim 20 including the step of subjecting the color samples to a four-dimensional filtering in a CMYK color space.

24. A method according to claim 20 wherein the image processing comprises a color correction.

25. A method according to claim 20 wherein the image processing comprises an image montage.

26. A method for generating a geometric mask within a stored color image, comprising the steps of:

providing a monitor for displaying the stored color image, a corrected color image or other image data;

providing a coordinate input unit for indicating image coordinates on the monitor;

providing a color sample memory for storing color samples;

providing a mask memory for storing a mask;

providing a color computer for correction of color values of the stored color image;

providing an image store for storing an original color image or corrected color image;

collecting color samples from a color image with the color input unit;

storing the color values of the collected color samples in the color sample memory;

displaying an arrangement of the color samples in a color space on the monitor with a color coordinate system;

subjecting the collected color samples to a filtering, the color sample space produced in a color space having an arbitrary shape and being employed for selective color correction;

with a color computer, using the color sample space for mask generating;

writing an extreme value into the color computer at locations in the color space defined by the color sample space, and applying image data of the color image to the color computer;

comparing output data of the color computer to a threshold;

when the comparison to the threshold shows that color data belong to one of the color samples, setting a memory cell in the mask memory;

generating a geometric mask by the above steps and displaying it in the image on the monitor and using it for image processing; and said filtering of the color samples occurring in a L*a*b* color space and said filtering of the filtering, being established by a function $$S(L^*,a^*,b^*) = \sum_i \sum_j \sum_k a(i,j,k) P(L^*+i, a^*+j, b^*+k)$$

whereby a(i,j,k) is a weighting matrix P(L*,a*,b*) is a color sample at location L*,a*, b* in the L*,a*,b* color space, −n>=k>=+n, and the sum S(L*,a*,b*) is compared to thresholds.

27. A method for generating a geometric mask within a stored color image, comprising the steps of:

providing a monitor for displaying the stored color image;

providing a coordinate input unit for indicating image coordinates on the monitor;

providing a color sample memory for representing a color space and for storing color samples;

providing a mask memory for storing a mask;

providing a color computer for correction of color values of the stored color image;

providing in addition to said color sample memory a separate image store for storing an original color image;

collecting color samples from a color image with the color input unit;

storing the color values of the collected color samples in the color sample memory;

displaying an arrangement of the color samples in a color space on the monitor with a color coordinate system;

subjecting the collected color samples to a filtering to perform at least one of the functions of removing undesired gaps between the samples and removing selected color samples which are isolated from a main group of the selected color samples, the color sample space produced in a color space having an arbitrary shape and being employed for selective color correction;

with the color computer, using the color sample space for mask generating;

writing an extreme value into the color computer at locations in the color space defined by the color sample space, and applying image data of the color image to the color computer;

comparing output data of the color computer to a threshold;

when the comparison to the threshold shows that color data belong to one of the color samples, setting a memory cell in the mask memory; and generating the geometric mask by the above steps and displaying it in the image on the monitor and using it for image processing.

* * * * *